Dec. 20, 1938.  E. M. SUMMERHAYS  2,140,820
CONNECTING PIN
Filed May 26, 1938
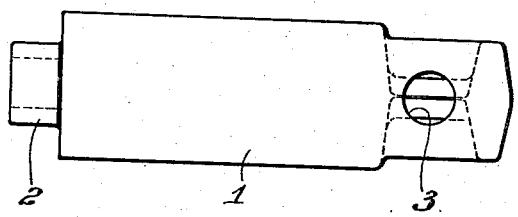
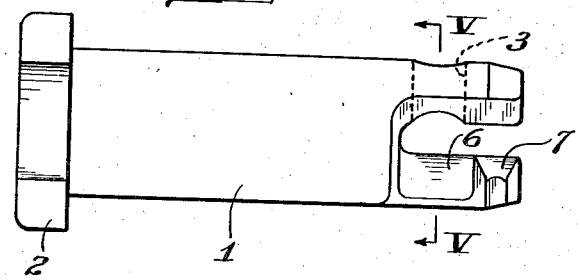
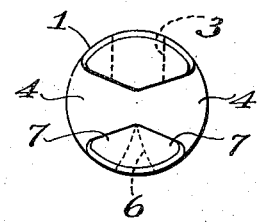
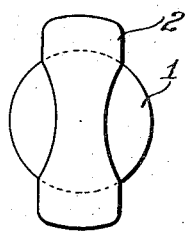
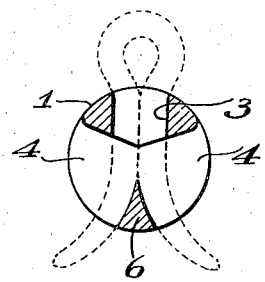
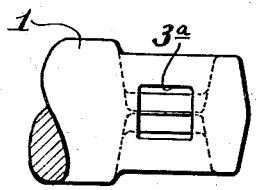
WITNESSES
ABWallace.
V. A. Peckham.
INVENTOR.
Elmer M. Summerhays
BY Brown, Critchlow + Flick
his ATTORNEYS.

Patented Dec. 20, 1938

2,140,820

UNITED STATES PATENT OFFICE 2,140,820

CONNECTING PIN

Elmer M. Summerhays, Warren, Ohio, assignor to Frederic Schaefer, Pittsburgh, Pa.

Application May 26, 1938, Serial No. 210,195

7 Claims. (Cl. 85—8)

This invention relates to connecting pins, and more particularly to such pins which are formed for spreading a cotter pin when it is driven therethrough.

Numerous ways have been suggested for forming connecting pins for the reception and spreading of cotter pins, but among the chief objections to many of these connecting pins are the difficulty and expense of making them.

It is among the objects of this invention to provide a connecting pin adapted to automatically spread a cotter pin driven into it which is simple in form, is made from a minimum of metal, is readily and inexpensively formed, and which is dependable in operation.

The preferred embodiment of this invention is illustrated in the accompanying drawing in which Fig. 1 is a side view of my pin; Fig. 2 is a plan view thereof; Fig. 3 is an end view of the head; Fig. 4 is an end view of the cotter-receiving end of the pin; Fig. 5 is a transverse section taken on the line V—V of Fig. 1; and Fig. 6 is a fragmentary plan view of a modification adapted to receive a square cotter pin.

In accordance with this invention a pin has a shank provided at one end with a drilled opening extending only part-way through it. The portion of the shank between the inner end of the opening and the opposite side of the shank is forged to form a pair of recesses opening laterally in opposite directions and communicating with the inner end of the drilled opening. The inner walls of the two recesses converge toward the inner end of the opening and thereby form a wedge-shaped wall between them which spreads a cotter when driven inwardly of the opening and against the inner edge of the wedge-shaped wall. The opposite end of the shank is provided with a head in the form of a bar projecting beyond the periphery of the shank at only two diametrically opposite points and preferably having concave side walls.

Referring to the drawing, a pin is forged from a metal blank to form the usual cylindrical shank 1 having at one end a head 2 integral therewith. It is a feature of this invention that the opposite end of the shank is formed for the reception and automatic spreading of a cotter pin driven transversely through it. Accordingly, the end portion of the shank is provided with a radial opening 3 drilled less than halfway through it. The remaining portion of the end, that is, the portion between the inner end of opening 3 and the opposite side of the shank, is so formed during the forging operation as to provide in its opposite sides a pair of recesses 4 opening laterally in generally opposite directions (Figs. 4 and 5). The drilled opening 3 opens into both recesses which are separated for the most part by an inwardly directed wedge-shaped wall 6 the sides of which form the inner walls of the recesses and converge toward the adjacent inner end of the opening as shown in Fig. 5. The inner edge of wall 6 is preferably spaced from the drilled opening. A cotter pin inserted in the opening and driven inwardly will straddle the wedge-shaped wall 6 whereby the cotter will be spread and automatically locked in place. Such a cotter pin in locked position is indicated by broken lines in Fig. 5. To aid in spreading the cotter pin, the inner corner of each of its legs should be rounded off so that it will not jam against the inner edge of the wedge-shaped wall instead of sliding down the inclined side of the wall. As shown in Figs. 1 and 4, the outer end portion of the wedge-shaped wall is provided with laterally extending flanges 7 which help guide the legs of the cotter pin as they are driven across the inclined sides of wall 6. These flanges also help protect the end of the pin, and give it a more finished appearance.

As shown in Fig. 3, the head does not extend beyond the periphery of the shank around its entire circumference, but only at two diametrically opposite points. That is, the head is in the general shape of a narrow bar, only the ends of which project beyond the periphery of the shank. An advantage of this type of head is that it saves metal and decreases the weight of the pin. These advantages are increased by decreasing the central width of the head by making its side walls concave.

The pin shown in Fig. 6 is provided with a square opening 3a for the reception of a square cotter pin.

A connecting pin formed in accordance with this invention is made of a minimum amount of metal because of the shape of its head and the open recesses forged in its cotter-receiving end. The pin can be very quickly and readily made by a forging operation followed by the drilling of only one short opening, whereby the cost of producing the pin is further reduced. The difficulties and expense arising in the prior art from trying to drill three radial openings for the reception and spreading of a cotter pin are obviated by this invention because the forged recesses in the pin take the place of two of such openings.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A pin provided in opposite sides adjacent one end with a pair of open-sided recesses having an inwardly directed wedge-shaped wall between them, there being a portion of the pin adjacent the inner edge of said wall provided with an opening terminating at its inner end adjacent said inner edge, said opening being adapted to receive a cotter pin that is spread when driven against said wedge-shaped wall.

2. A pin provided in opposite sides adjacent one end with a pair of open-sided recesses having an inwardly directed wedge-shaped wall between them, there being a portion of the pin adjacent the inner edge of said wall provided with an opening terminating at its inner end adjacent said inner edge, said opening being adapted to receive a cotter pin that is spread when driven against said wedge-shaped wall, and the outer end of said wall being provided with laterally extending flanges.

3. A pin provided in opposite sides adjacent one end with a pair of open-sided recesses having a radially disposed wedge-shaped wall between them with its sides converging inwardly, there being a portion of the pin spaced from and opposite to the inner edge of said wall provided with a radial opening terminating at its inner end adjacent said inner edge, said opening being adapted to receive a cotter pin that is spread when driven against said wedge-shaped wall.

4. A pin provided in opposite sides adjacent one end with a pair of open-sided recesses having a radially disposed wedge-shaped wall between them with its sides converging inwardly, there being a portion of the pin spaced from and opposite to the inner edge of said wall provided with a radial opening terminating at its inner end adjacent said inner edge, said opening being adapted to receive a cotter pin that is spread when driven against said wedge-shaped wall, and the outer end of said wall being provided with laterally extending flanges.

5. A pin having a shank provided at one end with an opening extending only partway through it and with a pair of open-sided recesses opening laterally in opposite directions from the inner end of said opening, the inner walls of said recesses converging toward said inner end of the opening whereby a cotter pin disposed in the opening and driven inwardly is spread by said walls.

6. A pin having a bifurcated end one portion of which has a radially disposed wedge-shaped wall, and the other portion of which is provided with a radial opening terminating at its inner end adjacent the inner edge of said wall, said opening being adapted to receive a cotter pin that is spread when driven against said wall.

7. A pin having a bifurcated end one portion of which has a radially disposed wedge-shaped wall terminating at its outer end in laterally projecting flanges, and the other portion of which is provided with a radial opening terminating at its inner end adjacent the inner edge of said wall, said opening being adapted to receive a cotter pin that is spread when driven against said wall.

ELMER M. SUMMERHAYS.